(12) United States Patent
Hicks et al.

(10) Patent No.: US 6,851,735 B2
(45) Date of Patent: Feb. 8, 2005

(54) REAR VEHICLE STORAGE SYSTEM

(75) Inventors: Thomas S. Hicks, Livonia, MI (US); Gary J. D'Annunzio, Macomb, MI (US); Timothy Smith, Redford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/348,859

(22) Filed: Jan. 22, 2003

(65) Prior Publication Data

US 2004/0145206 A1 Jul. 29, 2004

Related U.S. Application Data

(60) Provisional application No. 60/358,262, filed on Feb. 20, 2002.

(51) Int. Cl.$^7$ ................................................. B60N 3/00
(52) U.S. Cl. .................. 296/37.1; 296/37.16; 296/1.07; 296/191; 224/511; 224/485; 224/281; 410/130
(58) Field of Search ............................. 296/37.1, 37.6, 296/37.8, 37.14, 37.16, 1.07; 410/121, 129, 140, 130; 224/402, 403, 405, 281, 485, 511, 533, 537, 42.33, 42.39, 539, 917.5, 925

(56) References Cited

U.S. PATENT DOCUMENTS

| | | | |
|---|---|---|---|
| 1,171,198 A | | 2/1916 | Hellberg |
| 1,661,188 A | | 3/1928 | Matthews |
| 4,189,056 A | | 2/1980 | Majewski |
| 4,705,315 A | * | 11/1987 | Cherry ...................... 296/37.1 |
| 4,869,628 A | * | 9/1989 | Fletcher ...................... 410/100 |
| 4,889,377 A | * | 12/1989 | Hughes .......................... 296/3 |
| 5,535,931 A | | 7/1996 | Barlow et al. |
| 5,626,380 A | | 5/1997 | Elson et al. |
| 5,685,470 A | | 11/1997 | Moore |
| 5,715,978 A | * | 2/1998 | Ackeret ................... 224/42.33 |
| 5,762,244 A | * | 6/1998 | Wagner et al. ............... 224/281 |
| 5,855,310 A | | 1/1999 | Van Ert et al. |
| 5,915,777 A | | 6/1999 | Gignac et al. |
| 6,050,202 A | | 4/2000 | Thompson |
| 6,062,452 A | * | 5/2000 | Kauskey ...................... 224/539 |
| 6,092,708 A | | 7/2000 | Rand |
| 6,135,527 A | | 10/2000 | Bily |
| 6,138,883 A | * | 10/2000 | Jackson et al. ............. 224/404 |
| 6,149,040 A | | 11/2000 | Walker |
| 6,176,535 B1 | | 1/2001 | Chaloult et al. |
| 6,189,945 B1 | * | 2/2001 | Rockett ...................... 296/37.6 |
| 6,241,137 B1 | | 6/2001 | Corr |
| 6,247,741 B1 | | 6/2001 | Seel et al. |
| 6,276,583 B1 | | 8/2001 | Tourneur |
| 6,296,289 B1 | | 10/2001 | Gehring et al. |
| 6,308,873 B1 | | 10/2001 | Baldas et al. |
| 6,338,518 B1 | | 1/2002 | D'Annunzio et al. |
| 6,375,055 B1 | | 4/2002 | Spykerman et al. |
| 6,481,773 B1 | | 11/2002 | Salani et al. |
| 6,554,342 B1 | * | 4/2003 | Burnett ...................... 296/37.6 |
| 6,623,059 B2 | | 9/2003 | Gehring et al. |
| 6,676,184 B2 | | 1/2004 | Gehring et al. |
| 6,676,185 B2 | | 1/2004 | Gehring et al. |
| 2002/0006847 A1 | | 1/2002 | Sagara et al. |

(List continued on next page.)

FOREIGN PATENT DOCUMENTS

| | | |
|---|---|---|
| DE | 40 15 556 | 11/1990 |
| JP | 2000-318529 | 11/2000 |
| JP | 2000-3357317 | 12/2000 |

*Primary Examiner*—Patricia L. Engle
(74) *Attorney, Agent, or Firm*—Bill C. Panagos (57) ABSTRACT

A motor vehicle storage apparatus includes a base and at least one storage panel for storing a variety of articles thereon. The base has at least one slot capable of engaging a portion of the storage panel and retaining the storage panel in a vertical position. The storage panel may be removable mounted within the motor vehicle storage apparatus or stored outside the storage apparatus. The storage panel has at least one attachment location for attaching articles thereon.

22 Claims, 8 Drawing Sheets

U.S. PATENT DOCUMENTS

| | | |
|---|---|---|
| 2002/0014777 A1 | 2/2002 | Gehring et al. |
| 2002/0047032 A1 | 4/2002 | Schlecht |
| 2002/0190535 A1 | 12/2002 | Gehring et al. |
| 2003/0090121 A1 | 5/2003 | Gehring et al. |
| 2003/0209919 A1 | 11/2003 | Gehring et al. |
| 2003/0214144 A1 | 11/2003 | Gehring et al. |
| 2003/0218347 A1 | 11/2003 | Gehring et al. |

* cited by examiner

REAR VEHICLE STORAGE SYSTEM

CROSS REFERENCE TO RELATED APPLICATIONS

This application claims priority to U.S. Provisional Patent Application Ser. No. 60/358,262, filed on Feb. 20, 2002.

BACKGROUND OF THE INVENTION

This invention relates in general to motor vehicles and, more particularly, to a removable storage assembly for motor vehicle cargo areas and trunk compartments which reduces the risk that cargo will shift, slide, or roll about the cargo area and trunk compartment during the operation of the motor vehicle and allows ease of storage and retrieval of cargo items.

Motor vehicles are provided with cargo areas and trunk compartments for transporting and storing cargo. Cargo areas and trunk compartments are generally defined by a load surface extending between the motor vehicle side panels and the rear seat and rear end of the motor vehicle. The cargo transported and stored on the load surface typically shifts, slides, or rolls about the load surface in response to the motion of the motor vehicle induced by accelerating, braking, and turning.

It is desirable to prevent cargo from shifting about the load surface in an effort to promote safety and to prevent cargo from spilling or from being damaged when being transported or stored.

Quite often, cargo which shifts about the load surface comes to rest deep within the cargo area or trunk compartment. As a consequence, the motor vehicle operator or passenger must bend over and stretch to recover the cargo from the cargo area or trunk compartment.

Of recent popularity are cargo nets. Such nets are usually formed from flexible elastic cords having hooks or other fasteners that cooperate with eyes strategically located in the motor vehicle cargo area or trunk compartment. Such nets are limited in their applications. They fail to provide a rigid structure for receiving fragile cargo. Fastening the net can require the motor vehicle operator or passenger to bend and stretch into the cargo area or trunk compartment. Moreover, deployment of the net may require tension over the cargo that can crush and damage fragile cargo.

Various organizing arrangements have been proposed for use in motor vehicle cargo areas and trunk compartments. Such arrangements include partitions or racks that divide the cargo area or trunk compartment into a plurality of discrete storage areas. Some arrangements include partitions that are collapsible and removable to allow the arrangement to be folded and stored in a compact form. These arrangements may be expensive to manufacture, especially in the secondary market, and may be cumbersome to assemble. Moreover, such arrangements themselves fail to remain in a substantially fixed position.

In addition to the foregoing problems, cargo areas, unlike trunk compartments, are generally open spaces with no deep recesses that can be used to conveniently transport and store cargo. A storage apparatus is needed that permits cargo to be transported and stored in a motor vehicle without shifting or spilling and which permits cargo to be recovered without requiring the motor vehicle operator or passenger to bend and stretch deep within the motor vehicle cargo area or trunk compartment. A storage apparatus is needed that also allows for ease in storage of cargo within the vehicle and outside the vehicle as well.

BRIEF SUMMARY OF THE INVENTION

The present invention is directed towards a motor vehicle storage apparatus that meets the foregoing needs. The apparatus comprises a base. At least one storage panel is provided for storing a variety of articles thereon. The base has at least one slot capable of engaging a portion of the storage panel and retaining the storage panel in a vertical position. The storage panel may be removable mounted within the motor vehicle storage apparatus or stored outside the storage apparatus. The storage panel has at least one attachment location for attaching articles thereon. The attachment locations may have apertures, flexible straps, hooks, loops or any combination thereof to facilitate attachment of articles thereon.

Various objects and advantages of this invention will become apparent to those skilled in the art from the following detailed description of the preferred embodiment, when read in light of the accompanying drawings.

DETAILED DESCRIPTION OF THE INVENTION

Figure 1:
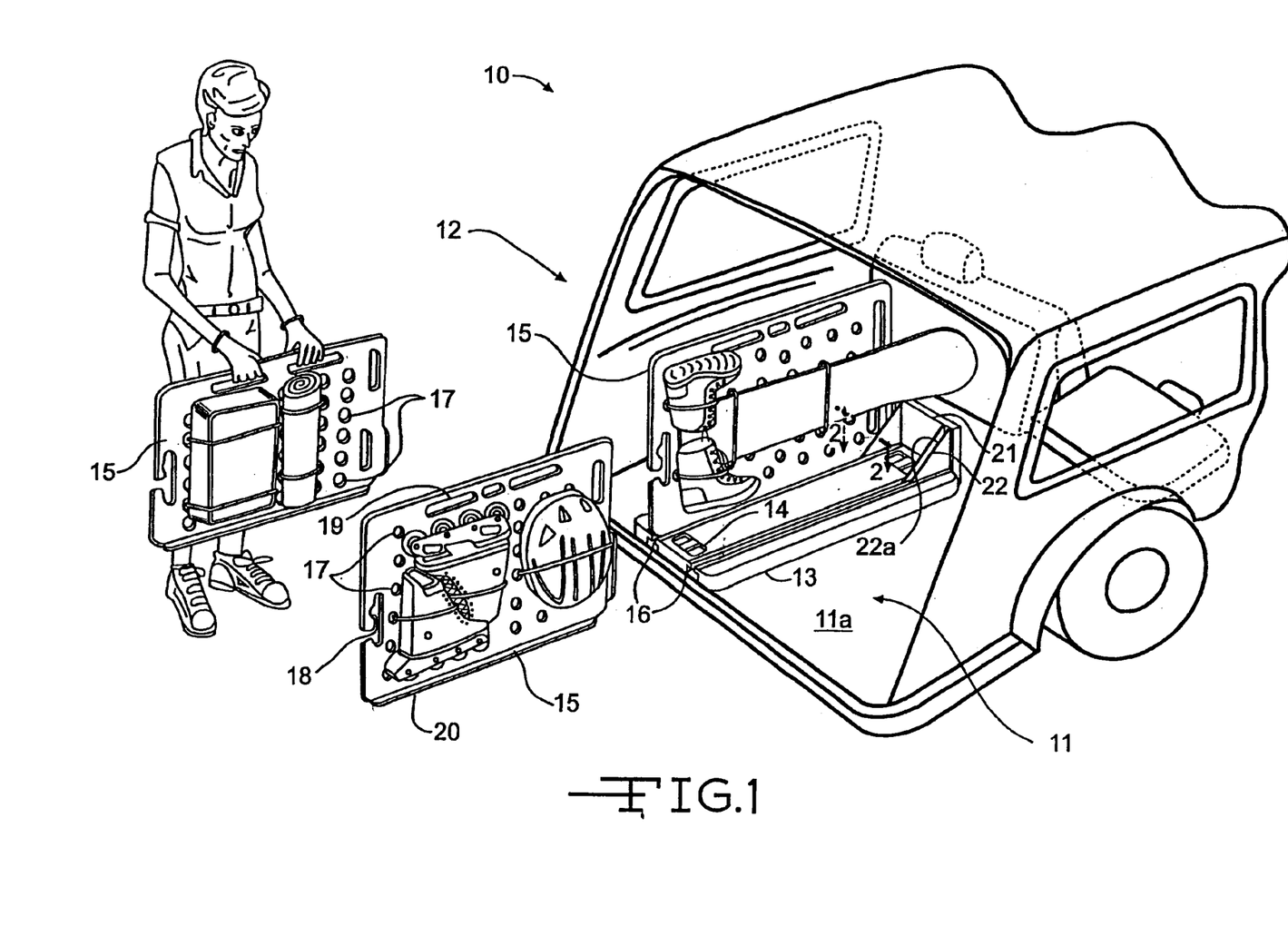
FIG. 1 is a rear perspective view of a motor vehicle with the motor vehicle cargo hatch removed for clarity and including a storage assembly in the motor vehicle cargo area, in accordance with the present invention.

Referring now to the drawings, there is illustrated in FIG. 1 a motor vehicle 10 having a cargo area or truck compartment 11 for storing and transporting cargo. The cargo area 11 is generally bounded by opposing laterally spaced walls and a rear seat. A floor 11a or load surface is provided for supporting cargo. A cargo hatch or trunk lid is generally provided to conceal the cargo area 11, however such in not shown in FIG. 1 for clarity purposes.

Figure 7:
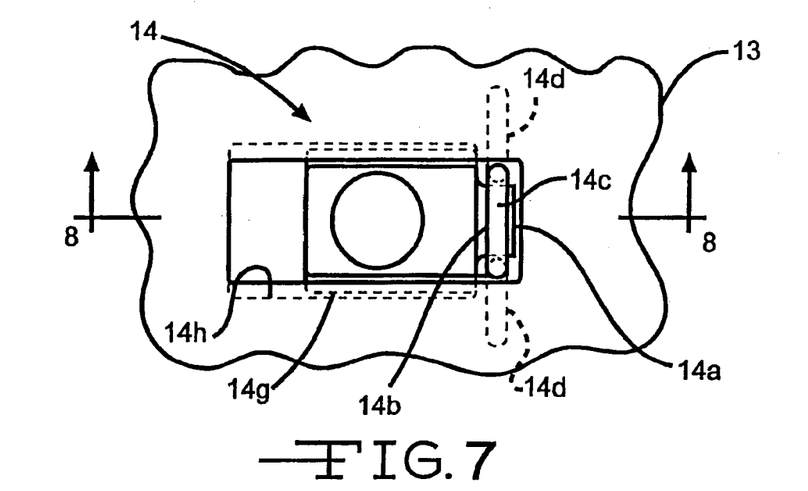
FIG. 7 is a top plan view of a portion of the base illustrating a latch for retaining the base of the storage assembly to a cargo loop of a motor vehicle floor.
Figure 8:
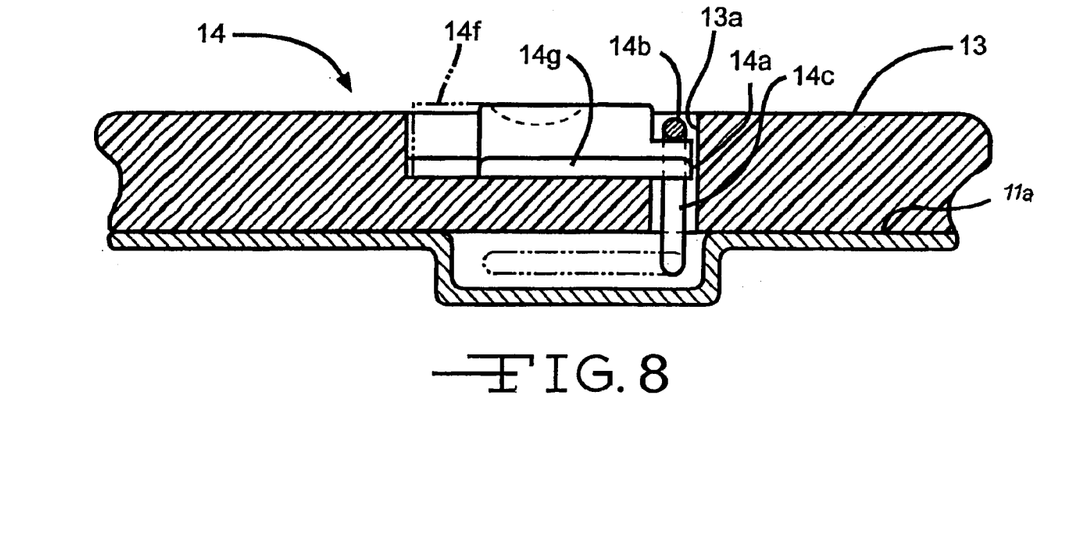
FIG. 8 is a cross-sectional view of the latch shown in FIG. 7 taken along line 8—8.

A storage assembly, indicated generally at 12, is adapted to be retained in the cargo area 12. The storage assembly generally includes a base 13 and one or more storage panels 15 removably mounted on the base 13. The base 13 is attached to a vehicle floor by a latch 14, as is best shown in FIGS. 7 and 8. The latch 14 may include any conventional attachment apparatus 14a, such as a slideably mounted finger, and may engage any conventional mounting apparatus 14b, such as an ISO-FIX latch or cargo tie-down ring. It is also conceived that the base 13 could be defined as a generally fixed permanent portion of the vehicle floor instead of separate releasably mounted structure.

At least one storage panel 15 is provided for securely holding various storage items thereto for safe and organized storage. The base 13 has a top surface containing one or more support slots 16 formed therein. The storage panels 15 may be partially received into the support slots 16 to be vertically, removably mounted to the base 13. Removably mounting the storage panel 15 allows for relative ease of access to the storage panel 15 for placement and removal of storage items on the storage panel 15 and allows for storage of the storage panel 15 and any storage items attached thereto outside the vehicle when not in use. The storage assembly, as illustrated, is shown within a cargo area, however this is merely one vehicle environment in which this storage assembly can be used and is not intended to limit the vehicle areas in which the storage assembly may be used. The use of a plurality of panels 15 interchangeably with a common base 13 is ideally suited for the storage and transportation of items which are commonly grouped together and loaded/unloaded into the vehicle. For example, one panel could be used to store various camping accessories while another panel is used to store sporting goods.

The storage panel 15 contains a plurality of attachment locations 17 to facilitate the attachment of various storage items to the storage panel 15. The attachment locations 17 may be defined as apertures through the storage panel 15 and may be shaped to receive quarter-turn fastening structures. The attachment locations 17 may be used to attach various storage items to the storage panel 15 and may be combined with traditional fasteners and flexible straps such as bungee cords, loops, and hooks to facilitate such attachment. Each of the attachment locations 17 may include at least one of the following apertures, fasteners, hooks, and loops. The storage panel 15 may also contain apertures 18 to facilitate the storage and hanging of the storage panel 15 when the storage panel 15 is not in use within the storage assembly 12. This allows the storage panel 15 and any storage items attached thereto to be stored conveniently outside the vehicle, and later quickly loaded securely into the vehicle. The storage panel 15 may also include at least one handle or handhold 19 which may be grasped by a user when inserting, removing, or carrying the storage panel 15. It is also contemplated that the attachment locations 17 of the storage panel 15 may have bungee cords, loops, or hooks attached directly thereto.

Figure 5:
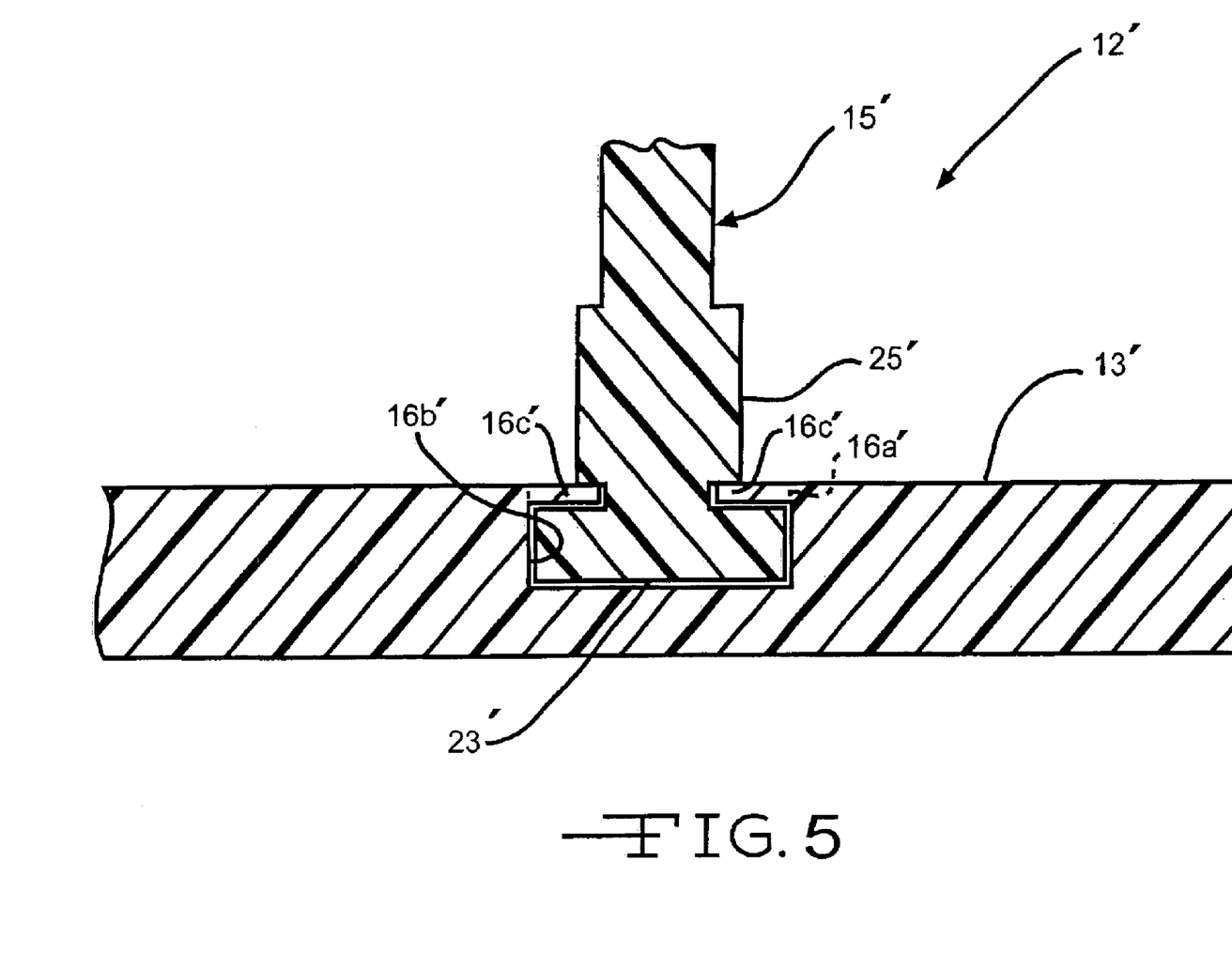
FIG. 5 is a cross-sectional view of a portion of the base and support slot with the storage panel shown in FIG. 4 taken along line 5—5.

The storage panel 15 includes a connector portion 20 for engaging the support slot 16 of the base 13 to provide vertical support. The support slot 16 extends through one side of the base 13. As best shown in FIGS. 1 and 5, the connector portion 20 of the storage panel 15 is horizontally slideably received through the support slot 16 to position the storage panel 15 within the support slot 16 and provide the storage panel 15 lateral support.

Figure 2:
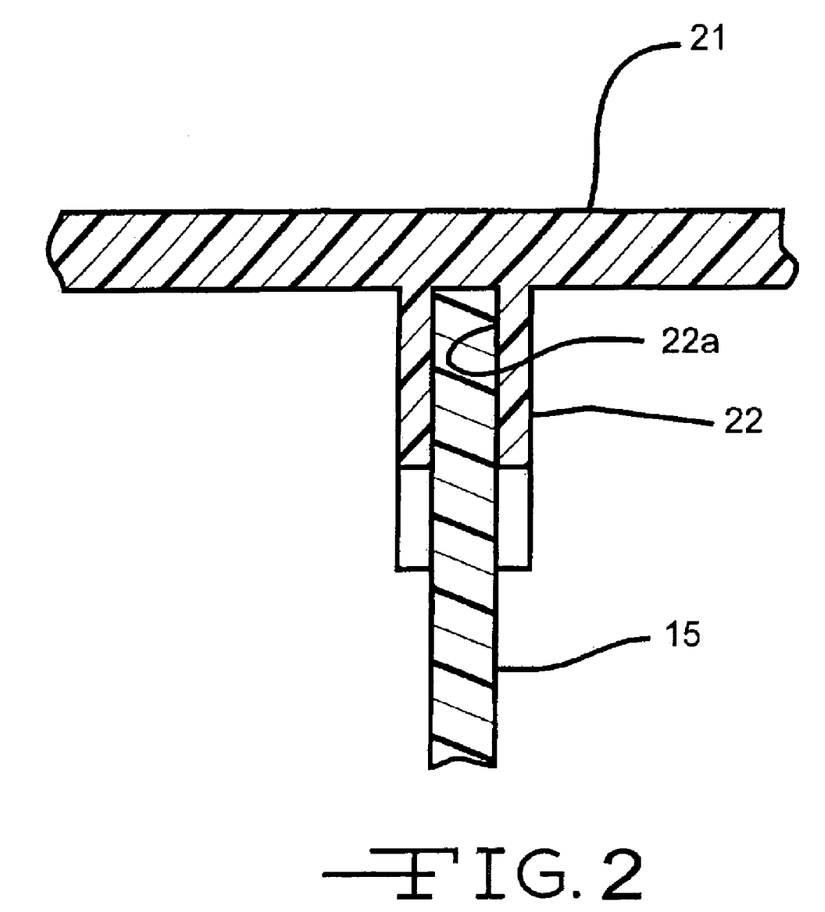
FIG. 2 is an enlarged cross-sectional plan view of a portion of the storage assembly shown in FIG. 1 generally taken along line 2—2 and looking downwardly at the base, further showing the storage panel engaged by the support structure of the vertical end wall of the base.

A vertical end wall 21 extends vertically from an end of the base 13 as is shown in FIGS. 1 and 2, although such is not required. The vertical end wall 21 defines a stop for the storage panel 15. The vertical end wall 21 may include a slot portion (not shown) to receive a portion of the storage panel 15. The slot portion of the vertical end wall 21 may provide lateral support for the storage panel 15, although such is not required. The vertical end wall 21 may also include a support structure 22 to laterally support the storage panel 15, although such is not required. The support structure 22 may include a slot 22a capable of receiving a portion of the storage panel 15.

Figure 3:
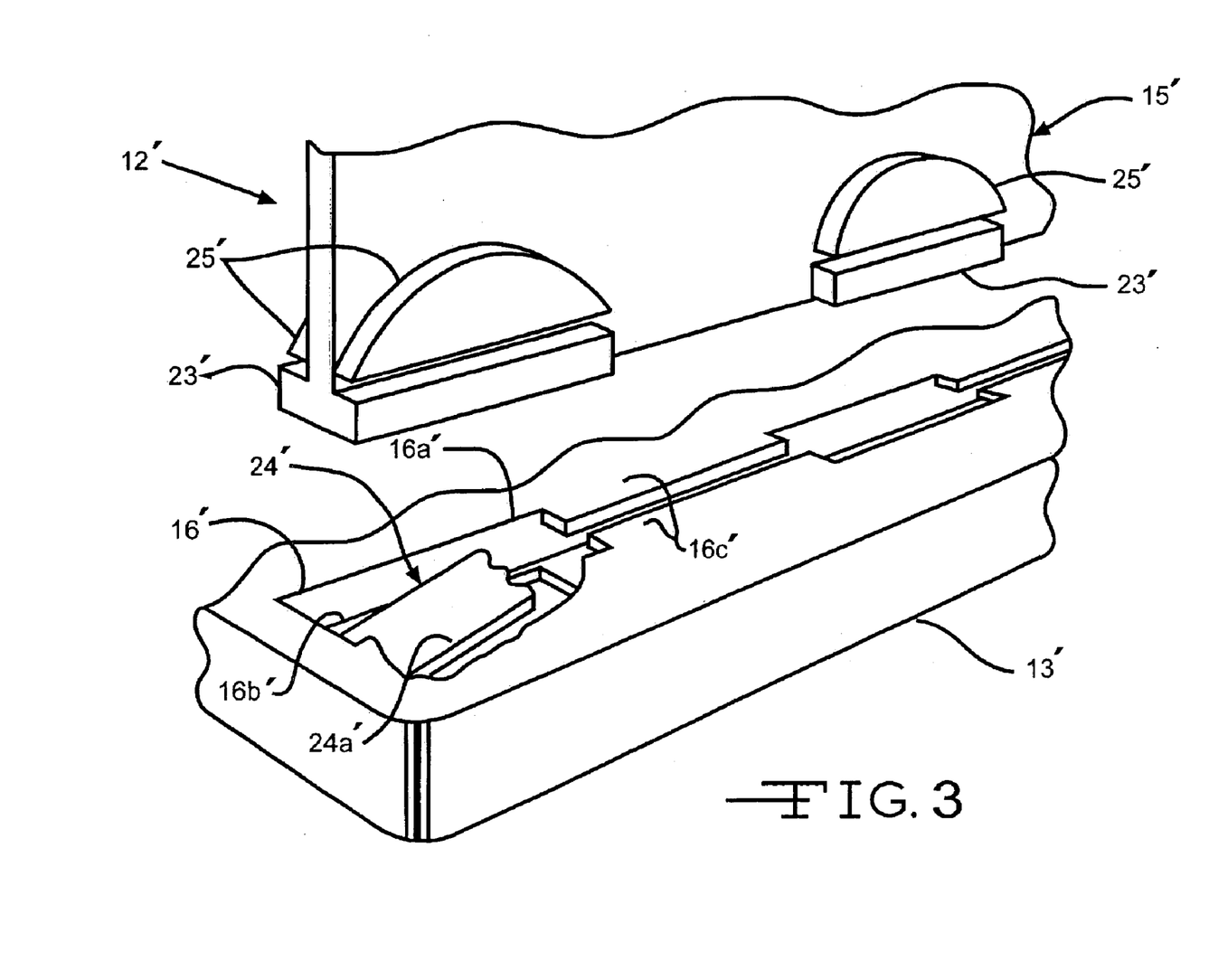
FIG. 3 is an enlarged perspective view of a portion of an alternate embodiment of a storage assembly similar to the storage assembly shown in FIG. 1 further showing a portion of the support slot and a portion of the bottom of the storage panel.
Figure 4:
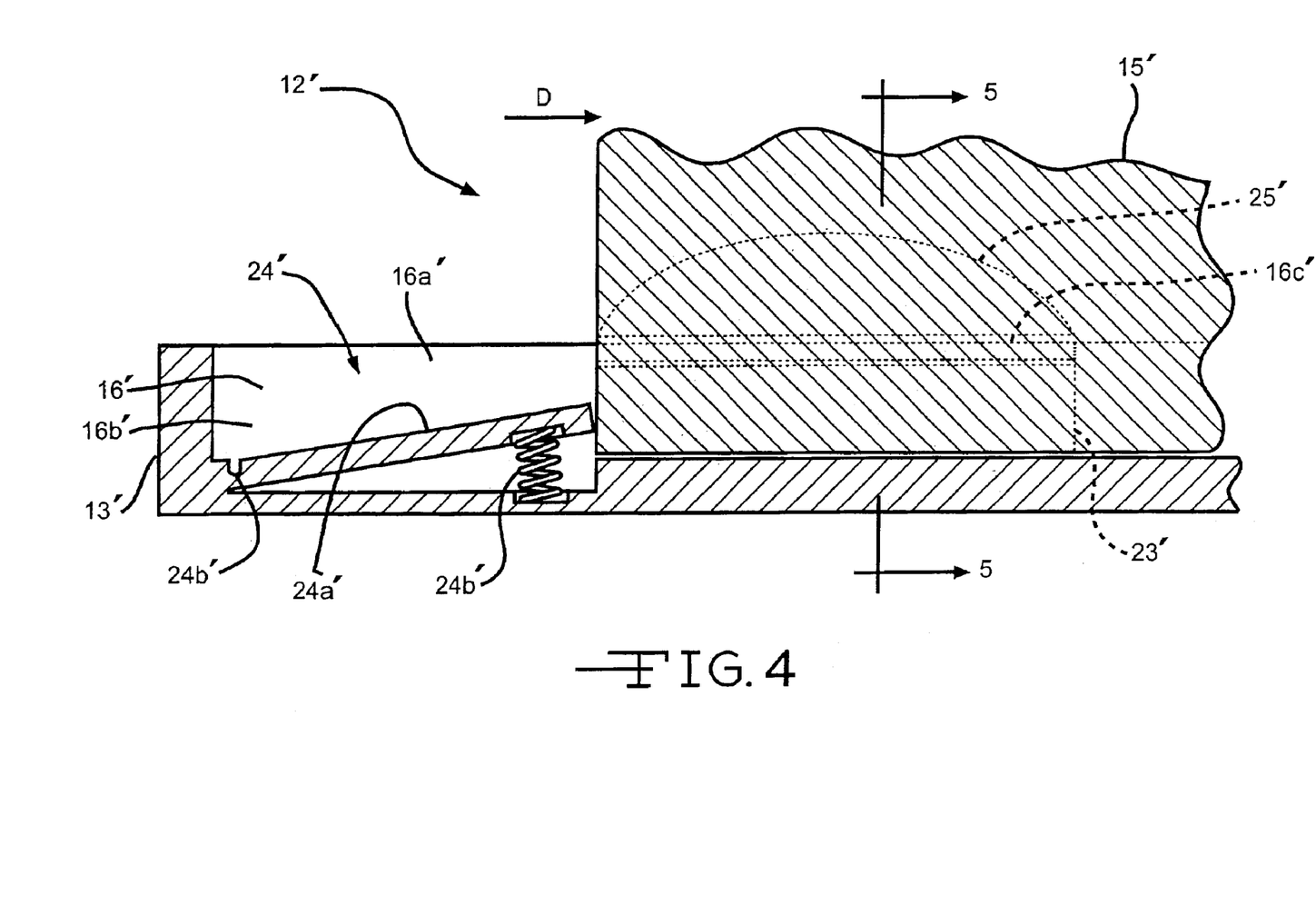
FIG. 4 is an enlarged partial sectional view of a portion of the base and support slot with the storage panel locked in position within the support slot.

Referring now to FIGS. 3 through 5, there is illustrated an alternate embodiment of a storage assembly, indicated generally at 12', according to this invention. Many of the components illustrated in FIGS. 3 through 5 are similar to corresponding components of FIG. 1 in structure and function. Therefore, such corresponding components are indicated by similar reference number in these Figures, but with those of FIGS. 3 through 5 having' (prime) suffixes.

Unlike the support slots 16 illustrated in FIG. 1, the support slot 16' of the base 13' extends through only a portion of the base 13'. The support slot 16' includes an upper portion 16a' and a lower portion 16b'. The base 13' includes a plurality of tab portions 16c' extending inwardly into the upper portion 16a' of the slot 16'. The tab portions 16c' may be provided as opposed pairs as illustrated, although such is not required. The tab portions 16c' extend relatively parallel to the surface of the base 13' in which the slot 16' is formed. The storage panel 15' includes at least one foot portion 23' having a first portion extended outwardly from a first side of the storage panel 15'. The foot portion 23' may also have a second portion extended outwardly from a second side of the storage panel 15' opposed from the first side to form a generally T-shaped bottom portion, although such is not required. A portion of the upper portion 16a' is shaped so that one of the foot portions 23' may be received therethrough. A portion of the upper portion 16a' including the tab portions 16c' is shaped so that a portion of the storage panel 15' may be received therethrough, however the foot portions 23' of the storage panel 15' may not be received therethrough.

To install the storage panel 15', each of the foot portions 23' of the storage panel 15' is vertically received through the generally wide upper portion 16a' of said support slot 16' without tab portions 16c', until the foot portions 23' are positioned within the lower portion 16b' of the support slot 16'. The storage panel may then be slid horizontally in a direction D, as shown in FIG. 4, so that each of the foot portions 23' are vertically aligned respectively with each of the tab portions 16c' of the support slot 16'. The tab portions 16a' prevent vertical movement of each of respective the foot portion 23' of the storage panel 15', and therefore retains the storage panel 15' to the base 13'.

To retain the panel 15' in the position shown in FIG. 4, the storage assembly 12' may include an optional locking mechanism 24'. The locking mechanism 24' engages the storage panel 15' and the base 13' to lock the storage panel 15' and the base 13' in the relative horizontal position described above, although such is not required. The locking mechanism 24' may include a release 24a' to unlock the storage panel 15' from the base 13'. The locking mechanism 24' may also include a spring mechanism 24b'. The spring mechanism 24b' may be either a mechanical or natural spring or both as illustrated. The release 24a' may be pivotally mounted so that the release 24a' may be depressed by one of the foot portions 23' when the foot portion 23' is positioned within the lower portion 16b' of the support slot 16. When the storage panel 15' is moved horizontally in direction D into position as described above, the foot portion 23' moves so that the foot portion 23' no longer is positioned above the release 24a'. The spring mechanism 24b' forces the release 24a' to return to a natural position such that the release 24a' extends vertically further than a portion of the foot portion 23', as shown in FIG. 4. The release 24a' prevents the foot portion 23' of the storage panel from moving horizontally. The release 24a' may be manually depressed so that the horizontal movement of the foot portion 23' is no longer restricted.

The storage panel 15' may include at least one support member 25' to engage the base 13' to provide vertical support for the storage panel 15'. The support members 25' may be provided as opposed pairs as best shown in FIGS. 3 and 5, although such is not required.

Figure 6:
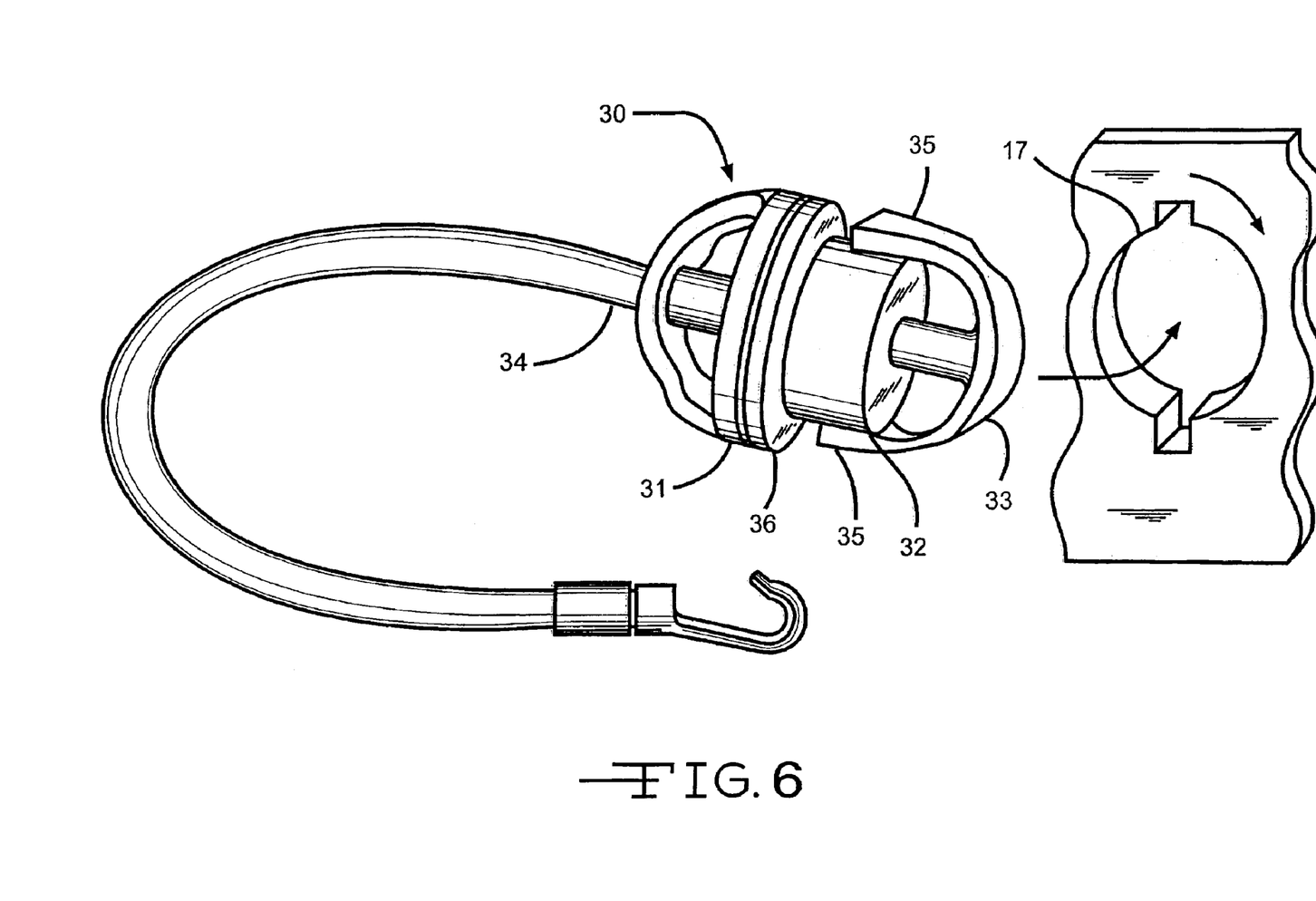
FIG. 6 is a perspective view of a fastener of the storage panel of the storage assembly.

Referring now to FIGS. 6, there is a fastener, indicated generally at 30, according to this invention. The fastener 30 can be fastened to the storage panels 15 and 15', shown in FIGS. 1 through 5, to secure storage items thereto. The fastener 30 is comprised of a back portion 31 and a front portion 32. The back portion 31 and the front portion 32 may be separate molded pieces or molded together as one molded piece. The front portion 32 is sized to be larger than the round diameter of the aperture of the attachment location 17. As illustrated, the back portion includes a loop apparatus 33, however both the back portion 31 and the front portion 32 may include a loop apparatus 33, although such is not required. The loop apparatus 33 can be used to attach bungee cords or other fastening devices for the attachment of storage items to the storage panel 15. As illustrated, the front portion 32 includes a strap apparatus 34, however both the back portion 31 and the front portion 32 may include a flexible strap apparatus 34, although such is not required. The strap apparatus 34 can be any conventional fastening means such as bungee cord. As shown, the strap apparatus includes a loop portion, although such is not required. As shown, the strap apparatus includes a hook portion at an end of the strap, although such is not required.

A pair of tabs 35 extend radially from opposed sides of the front portion 32 of the fastener 30. As shown, the pair of tabs 35 comprise the loop apparatus 33. The front portion 32 and the tabs 35 are shaped to fit through the fastener hole, shown in FIG. 6, when properly aligned together. The fastener 30 may include a semi-rigid center portion 36, although such is not required. The center portion 36 is composed of a flexible material such as foam. The flexible material of the center portion 36 must have a rigidity suitable to compress when force is applied by a user to allow the front portion 32 and the tabs 35 to extend through and beyond the fastener hole and be able to turn the fastener 30, so that the pair of tabs 35 are no longer aligned with the fastener hole as is commonly known in the art to lock the fastener into position. The flexible characteristics of the center portion 36 provides a desirable snug fit between the fastener 30 and the storage panel 15 and allows relative ease of installation and removal of the fastener 30 from the storage panel 15. This type of quarter-turn fastener is similar to the quarter-turn fastener method commonly used for fastening headlights into motor vehicles.

Referring now to FIGS. 7 and 8, the mounting apparatus 14b is illustrated as a conventional cargo tie-down ring and will be described as such, although it will be appreciated that the mounting apparatus 14b may be any suitable mounting apparatus. The mounting apparatus 14b generally remains in a horizontal position relatively parallel to the floor 11a and may be recessed within the floor 11a, as is shown in shadow in FIG. 8. The mounting apparatus 14b includes a loop portion 14c having a pair of outwardly extending legs 14d which are disposed in recesses formed in the base 13, thereby permitting pivoting movement of the loop portion 14c about an axis defined by the legs 14d. The mounting apparatus 14b is pivotable to a vertical position so that the opening in the mounting apparatus is in position to receive the attachment apparatus 14a as shown in FIG. 8. The mounting apparatus 14b is preferably pivoted to the vertical position prior to the base 13 contacting the floor 11a. The mounting apparatus 14b is received within a recess 13a in the base 13. The attachment apparatus 14a is illustrated as a slideably mounted finger, and will be described as such, although it will be appreciated that the attachment apparatus 14a may be any conventional attachment apparatus. The attachment apparatus 14a slides horizontally from an initial position indicated by phantom lines 14f to enter the opening in the mounting apparatus 14b as it is positioned within the recess 13a. Preferably, the attachment apparatus includes outwardly extending flanges 14g slidingly disposed in tracks 14h formed in the base 13. The attachment apparatus 14a and the recess 13a define a recess to retain the mounting apparatus 14b, and therefore retain the base 13 to the floor 11a. Thus, the interference of the attachment apparatus 14a within the loop portion 14c prevents the base 13 from being lifted upward from the floor 11a of the vehicle, and the presence of the upwardly extending attachment apparatus 14b in the recess 13a prevents horizontal movement of the base 13 relative to the floor 11a. The attachment apparatus 14a may be slid horizontally out of engagement with the mounting apparatus 14b, as is shown in shadow in FIG. 8, to release the base 13 from the floor 11a.

Figure 9:
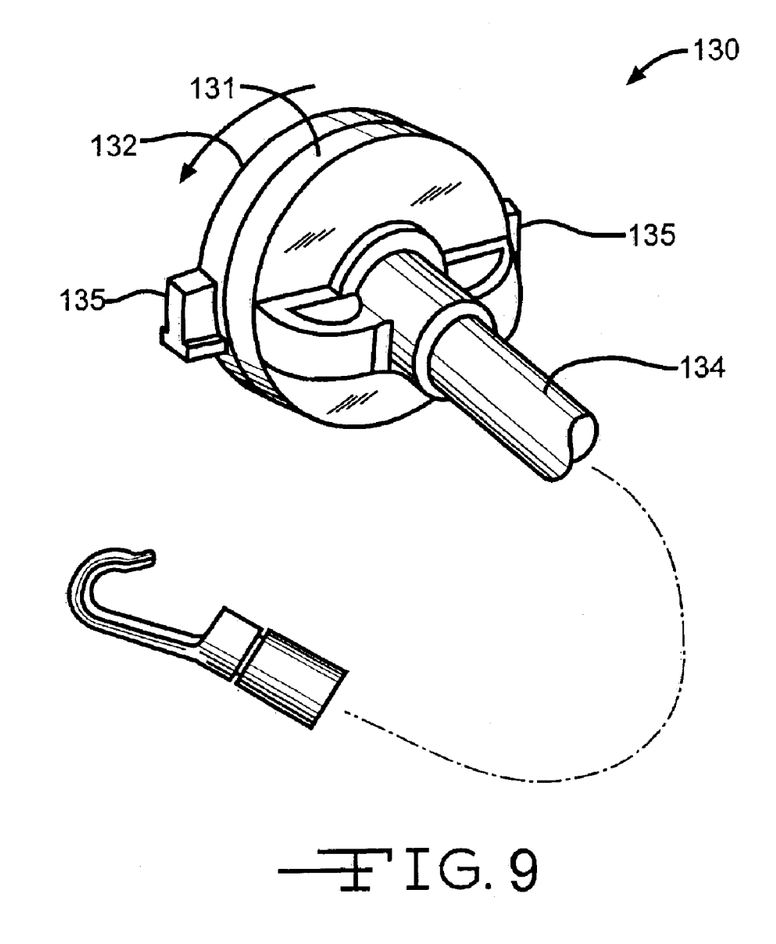
FIG. 9 is a perspective view of an alternate embodiment of a fastener of the storage panel of the storage assembly.

In FIG. 9, an alternate embodiment of a fastener, indicated generally at 130, according to this invention is shown. Many of the components illustrated in FIG. 9 are similar to corresponding components of FIG. 6 in structure and function. Therefore, such corresponding components are indicated by similar reference number in these Figures, but with those of FIG. 9 having one-hundred prefixes. The fastener is comprised of a back portion 131 and a front portion 132. The front portion 132 and the tabs 135 engage the aperture of a storage panel 15, wherein the storage panel 15 is comprised so that there exists a hollow center area. The front portion 132 and the tabs 135 are received into the aperture but not through the aperture. Instead, the front portion 132 and tabs 135 are received in the hollow center area of the storage panel 15. When the front portion 132 and the tabs 135 are positioned within the hollow center area of the storage panel 15, the fastener 130 is turned in the above described quarter-turn method to position the fastener 130 relative to the storage panel 15.

It is also contemplated that a fastener could be made of material that is magnetic in nature. The back portion may include a loop apparatus, although such is not required. The loop apparatus could be used to attach bungee cords or other fastening devices for the attachment of storage items to the storage panel. The back portion could include rope apparatus, although such is not required. The rope apparatus could be any conventional fastening means such as bungee cord. Unlike the above described fasteners, the fastener could be attached to a storage panel using the magnetic force between the front portions of two fasteners placed in an opposing manner on either side of a storage panel. The fastener may also attach to a storage panel using the magnetic force between the fastener and the storage panel, if the storage panel exerts such magnetic properties.

It is contemplated that the storage panel 15 may be sized to the height of the cargo area 11 such that a portion of the storage panel 15 may be horizontally slid into position within a support slot 16. A foot portion of the storage panel or other means for retaining the storage panel vertically within the support slot could be unnecessary as the roof wall of the cargo area would retain the storage panel within the support slot once positioned therein. It is further contemplated that a second support slot could be provided on the roof wall of the cargo area to engage a second portion of the storage panel.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A motor vehicle storage assembly comprising:
   a base having at least one support slot; and
   at least one storage panel for storing a variety of different articles thereon, wherein said storage panel includes a plurality of attachment locations for attaching said articles;
   wherein said storage panel includes a foot portion formed on a lower portion thereof and adapted to be inserted into said support slot for supporting said storage panel in a cantilevered vertically oriented position,
   and wherein said base includes a vertical end wall having a support structure to laterally support said storage panel.

2. An assembly according to claim 1 wherein said attachment locations are apertures through the storage panel.

3. An assembly according to claim 2 wherein said apertures are shaped to receive quarter-turn fasteners.

4. An assembly according to claim 1 wherein said storage panel includes at least one aperture for hanging said storage panel outside of a motor vehicle.

5. An assembly according to claim 1 wherein said storage panel includes a handle formed in said storage panel.

6. An assembly according to claim 1 in combination with a motor vehicle, wherein said base defines a floor portion of said vehicle.

7. An assembly according to claim 1 wherein said vertical end wall includes a slot portion capable of receiving a portion of said storage panel.

8. An assembly according to claim 1 wherein said base includes a latch for retaining said base to a floor of a motor vehicle.

9. An assembly according to claim 8 wherein said latch includes a moveably mounted finger for engaging a loop attached to the floor.

10. An assembly according to claim 1 wherein at least one of said attachment locations is defined by a fastener.

11. An assembly according to claim 10 wherein said fastener is a quarter-turn fastener.

12. An assembly according to claim 10 wherein said fastener includes one of a hook portion and an anchor portion.

13. An assembly according to 10 wherein said fastener includes a flexible strap.

14. An assembly according to claim 1 wherein said foot portion includes a first portion extending laterally and perpendicularly from an edge of said storage panel and a second portion extending laterally and perpendicularly from said edge of said storage panel in a direction opposite said first portion, to form a generally T-shaped bottom portion of the storage panel.

15. An assembly according to claim 1 wherein said support slot includes an upper portion and a lower portion wherein said foot portion of said storage panel is retained between said lower portion and said upper portion of said support slot.

16. An assembly according to claim 15 wherein said support slot extends through an edge of said base and said foot portion of said storage panel is horizontally slideably received through said support slot between said upper portion and said lower portion of said support slot.

17. An assembly according to claim 15 wherein said foot portion of said storage panel may be vertically received through a portion of said upper portion of said support slot, wherein said foot portion is slideable horizontally between said upper portion and said lower portion of said support slot such that the foot portion is slid into engagement with a portion of said upper portion of said support slot such that said foot portion is not vertically removable from said upper portion.

18. An assembly according to claim 1 wherein said storage panel includes at least one support member for engaging an upper surface of said base to provide vertical support to said storage panel.

19. A motor vehicle storage assembly comprising:
    a base having at least one support slot; and
    at least one storage panel for storing a variety of different articles thereon, wherein said storage panel includes a plurality of attachment locations for attaching said articles;
    wherein said storage panel includes a foot portion formed on a lower portion thereof and adapted to be inserted into said support slot for supporting said storage panel in a cantilevered vertically oriented position,
    a locking mechanism in said support slot to prevent said foot portion of said storage panel from horizontal movement within said support slot.

20. An assembly according to claim 19 wherein at least one of said attachment locations is defined by a fastener.

21. A motor vehicle storage assembly comprising:
    a base having at least one support slot; and
    at least one storage panel for storing a variety of different articles thereon, wherein said storage panel includes a plurality of attachment locations for attaching said articles;
    wherein said storage panel has a lower portion including a foot portion extending laterally therefrom and adapted to be inserted into said support slot for supporting said storage panel in a vertically oriented position, and wherein said lower portion further includes a support member extending laterally therefrom and spaced apart from said foot portion for engaging an upper surface of said base to provide vertical support to said storage panel.

22. An assembly according to claim 21 wherein at least one of said attachment locations is defined by a fastener.

* * * * *